United States Patent [19]
Johnson

[11] Patent Number: 5,100,365
[45] Date of Patent: Mar. 31, 1992

[54] GAME SUPPORT RACK
[76] Inventor: Ronald D. Johnson, P.O. Box 181, Warren, Ark. 71671
[21] Appl. No.: 658,252
[22] Filed: Jan. 19, 1991
[51] Int. Cl.⁵ .............................................. A22B 1/00
[52] U.S. Cl. .................................... 452/187; 452/189
[58] Field of Search ............... 248/362, 168; 452/187, 452/185, 189, 71

[56] References Cited
U.S. PATENT DOCUMENTS

| | | | |
|---|---|---|---|
| 3,894,313 | 7/1975 | Miller | 452/189 |
| 4,615,077 | 10/1986 | Beebe | 452/187 |
| 4,903,372 | 2/1990 | Jones | 452/187 |

Primary Examiner—Willis Little
Attorney, Agent, or Firm—Leon Gilden

[57] ABSTRACT

An apparatus including a triangular framework, with a hook mounted at each lower apex of the framework for mounting an animal to be suspended for subsequent cleaning, skinning, and the like. A mounting spike is directed through an upper apex of the framework, with a spacer mounted on the spike to position the framework in a spaced relationship relative to a support post. Additionally, the organization includes a removable tool member mounted about the spike permitting ease of removal of the organization subsequent to use.

2 Claims, 4 Drawing Sheets

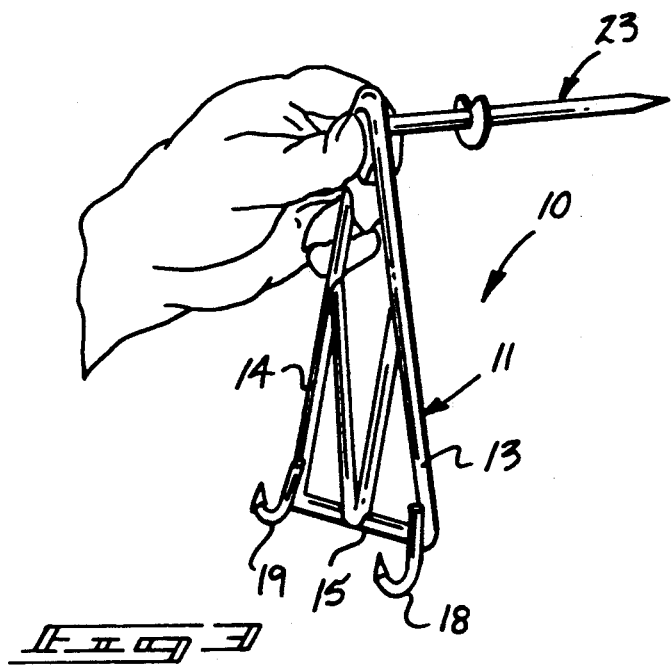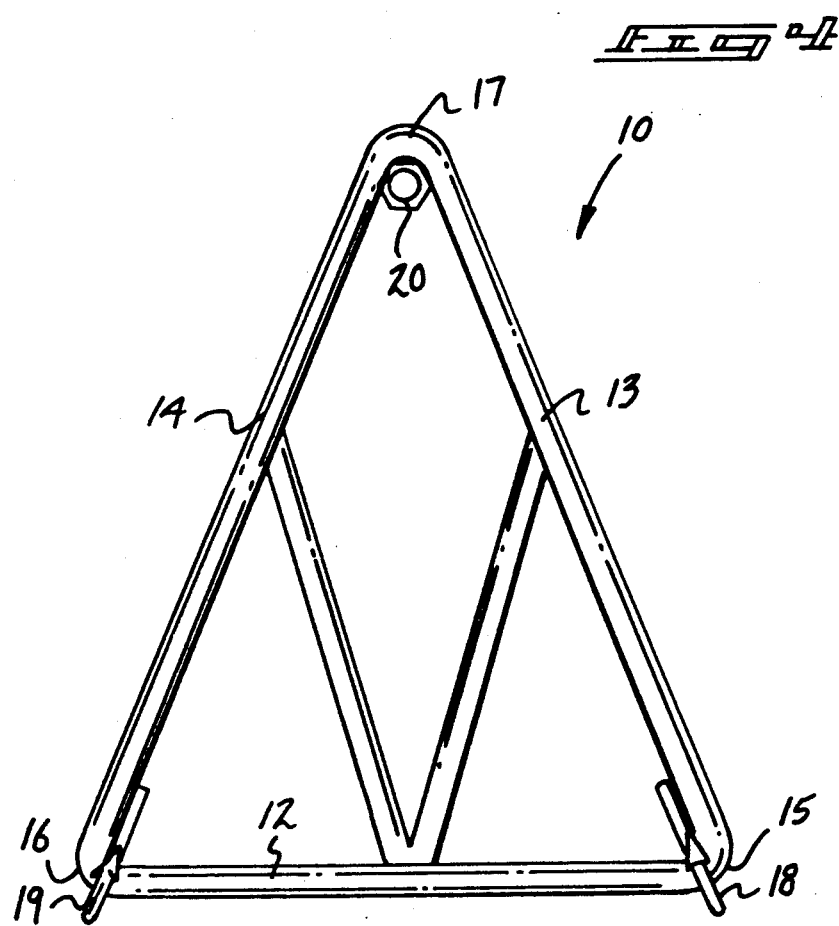

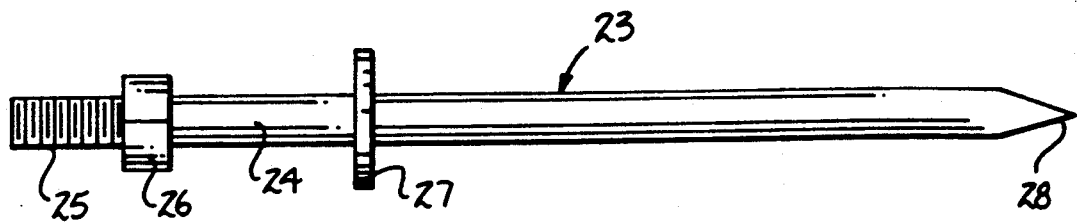
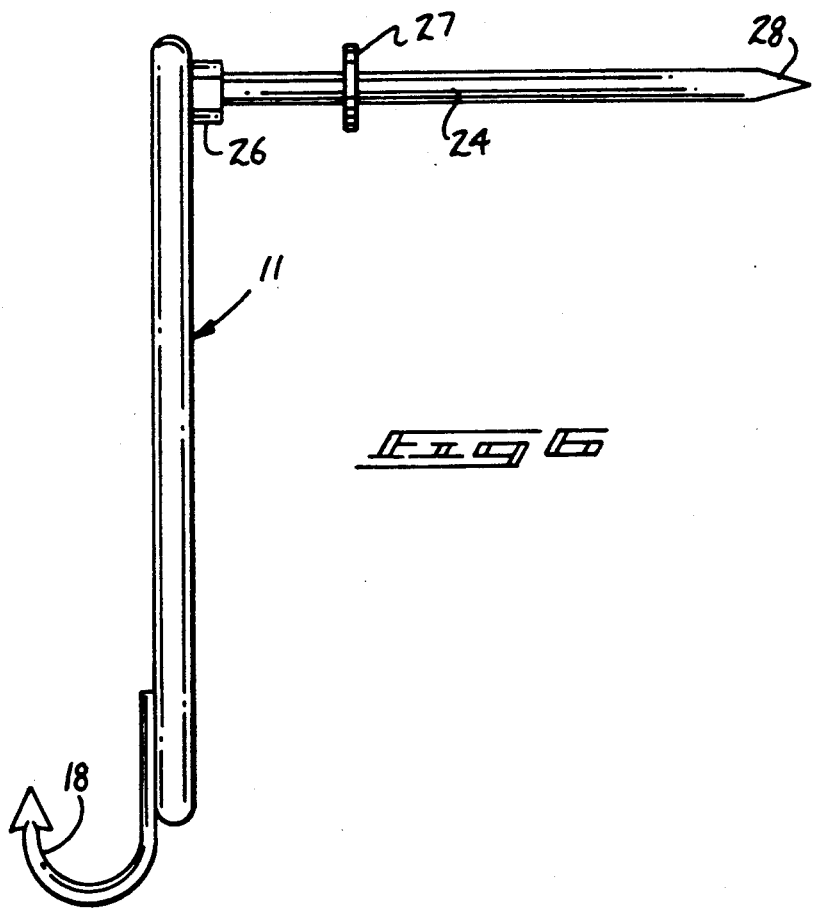

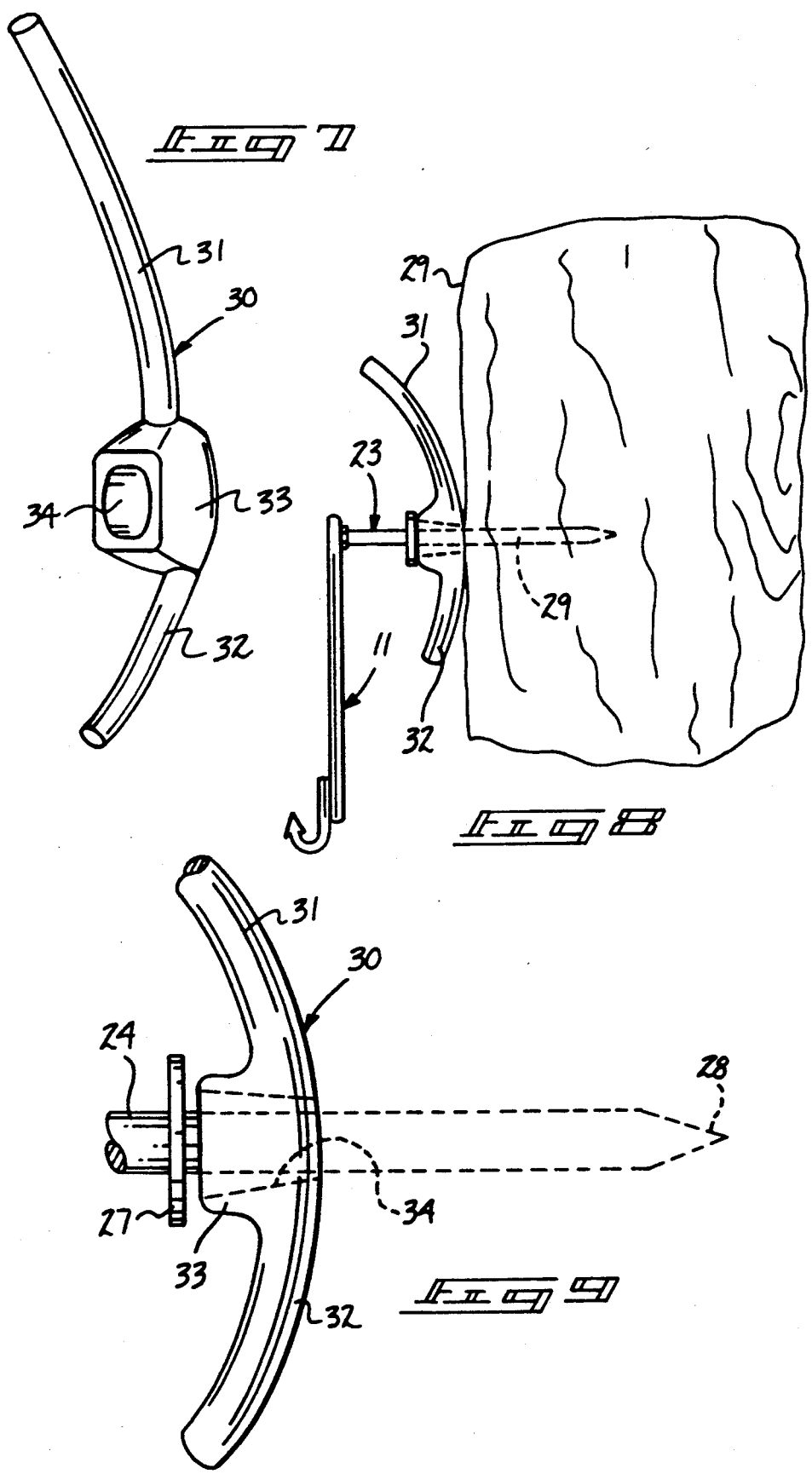

GAME SUPPORT RACK

BACKGROUND OF THE INVENTION

1. Field of the Invention

The field of invention relates to support apparatus, and more particularly pertains to a new and improved game support rack wherein the same is arranged for mounting game thereon for subsequent skinning and cleaning thereof.

2. Description of the Prior Art

Various support rack structure has been utilized in the prior art for mounting of game. Such structure may be found as an example in U.S. Pat. No. 4,763,942 to Lyon wherein a bar utilizing a plurality of suspension rings mounted from each end of the bar is arranged for suspending a game animal therefrom.

U.S. Pat. No. 4,615,077 to Beebe sets forth a support rack including a plurality of hooks mounted at opposed lower ends of the rack.

U.S. Pat. No. 4,094,041 to Steed provides for a holder for small game utilizing hooks mounted medially of sides of the rack with a lower loop for supporting game animals thereon.

As such, it may be appreciated that there continues to be a need for a new and improved game support rack as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of game support apparatus now present in the prior art, the present invention provides a game support rack wherein the same provides for positioning a rack in a spaced relationship relative to a mounting post. As such, the general purpose of the present invention, which will be described subsequently in greater detail, is to provide a new and improved game support rack which has all the advantages of the prior art game support apparatus and none of the disadvantages.

To attain this, the present invention provides an apparatus including a triangule framework, with a hook mounted at each lower apex of the framework for mounting an animal to be suspended for subsequent cleaning, skinning, and the like. A mounting spike is directed through an upper apex of the framework, with a spacer mounted on the spike to position the framework in a spaced relationship relative to a support post. Additionally, the organization includes a removable tool member mounted about the spike permitting ease of removal of the organization subsequent to use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved game support rack which has all the advantages of the prior art game support apparatus and none of the disadvantages.

It is another object of the present invention to provide a new and improved game support rack which may be easily and efficiently manufactured and marketed.

It is a further object of the present invention to provide a new and improved game support rack which is of a durable and reliable construction.

An even further object of the present invention is to provide a new and improved game support rack which is susceptible of a low cost of manufacture with regard to both materials and labor, and which accordingly is then susceptible of low prices of sale to the consuming public, thereby making such game support rack economically available to the buying public.

Still yet another object of the present invention is to provide a new and improved game support rack which provides in the apparatuses and methods of the prior art some of the advantages thereof, while simultaneously overcoming some of the disadvantages normally associated therewith.

Still another object of the present invention is to provide a new and improved game support rack wherein the same arranges a triangular rack, with its lower apex portions mounting hooks thereon in its upper apex portion arranged in a spaced relationship relative to a mounting post for providing spacing between the post and the support rack for providing enhanced access to a game animal mounted upon the rack.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic frontal view, taken in elevation, of the instant invention.

FIG. 5 is an orthographic side view of the mounting spike utilized by the instant invention.

FIG. 6 is an orthographic side view of the mounting spike and rack structure in an assembled configuration.

FIG. 7 is an isometric illustration of a removal lever utilized by the instant invention.

FIG. 8 is an orthographic side view of the removal lever in mounted relationship to the spike.

FIG. 9 is an enlarged orthographic side view of the removal lever in association with the mounting spike.

DESCRIPTION OF THE PREFERRED EMBODIMENT

Figure 1:
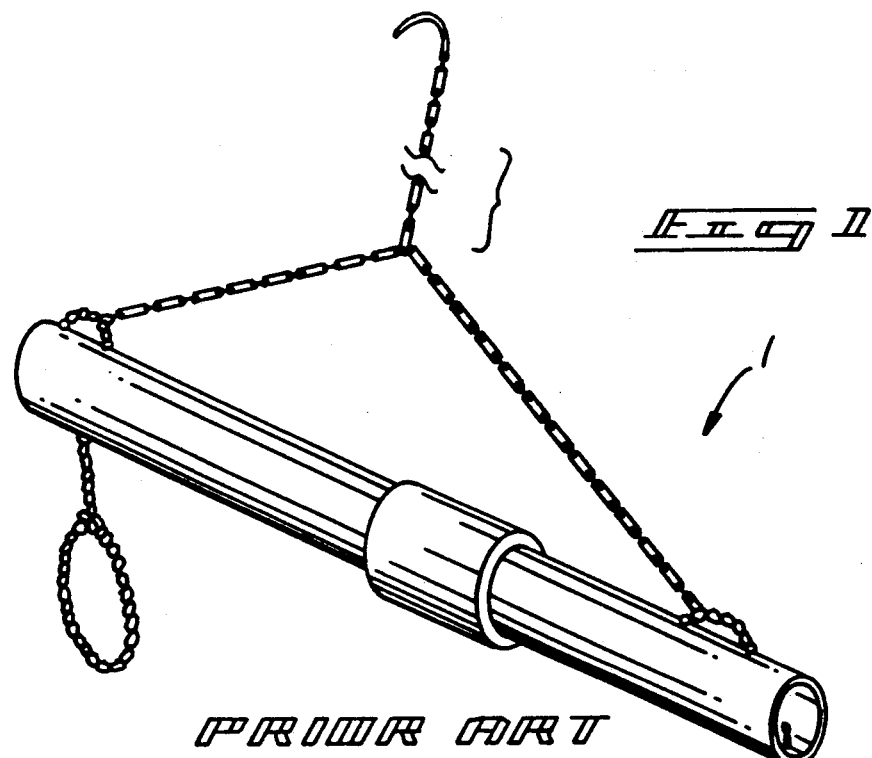
FIG. 1 is an isometric illustration of a prior art game support rack.

With reference now to the drawings, and in particular to FIGS. 1 to 9 thereof, a new and improved game support rack embodying the principles and concepts of the present invention and generally designated by the reference numeral 10 will be described.

Figure 2:
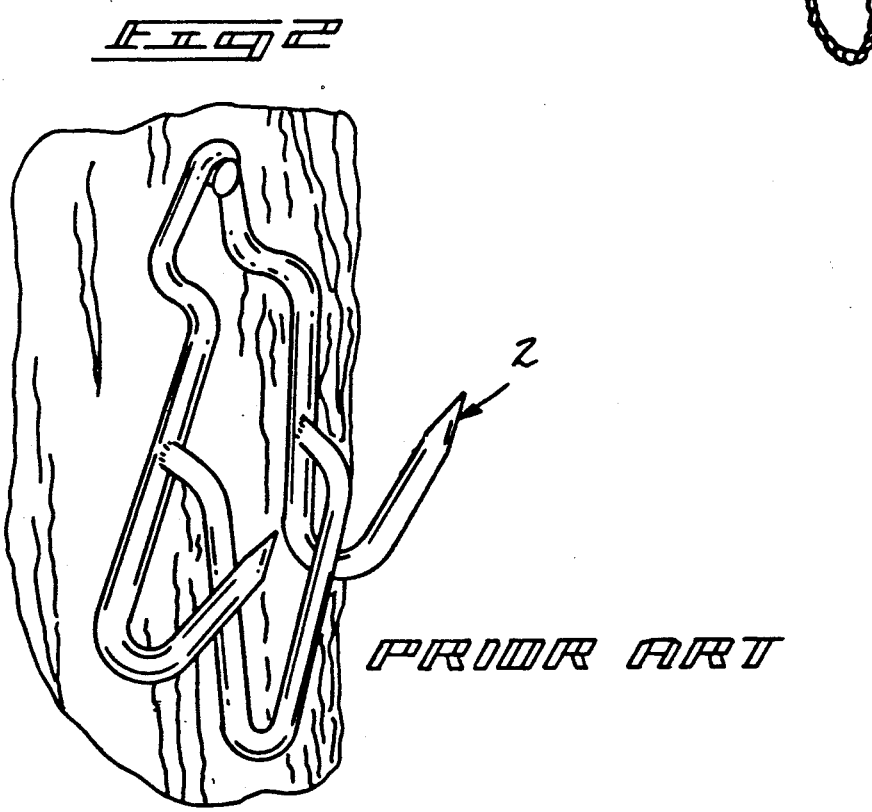
FIG. 2 is an isometric illustration of a further example of a prior art game support rack.

FIG. 1 illustrates a prior art game support rack apparatus 1, as set forth in U.S. Pat. No. 4,763,942, providing loop members for supporting a game animal's legs therethrough. FIG. 2 illustrates a further example of a prior art game support rack, as set forth in U.S. Pat. No. 4,615,077, wherein the rack structure 2 utilizes a plurality of spaced hooks mounted medially of the elongate length of the rack as illustrated for mounting game thereon.

More specifically, the game support rack 10 of the instant invention essentially comprises a triangular framework 11 defined by a base leg 12, a right leg 13, and a left leg 14 defining a first apex junction 15 formed by an intersection of the base leg 12 and the right leg 13. A second apex junction 16 is defined by an intersection of the left leg 14 and the base leg 12, and a third apex junction 17 is formed by an intersection of the right and left legs 13 and 14 respectively. A respective first and second hook 18 and 19 are mounted at the first and second junctions 15 and 16 and extend orthogonally outwardly of the framework 11, with an internally threaded support boss 20 mounted at the third apex junction 17. The support boss 20 and its internally threaded bore defines an axis orthogonally oriented relative to the triangular framework 11. A respective first and second reinforcing leg 21 and 22 extends medially from the respective right and left legs 13 and 14 and are mounted at an intersection medially of the base leg 12 to effect rigidity to the organization utilizing a minimum of structural components permitting access from the framework forwardly and rearwardly thereof when mounting a game animal thereon. A mounting spike 23 is defined by a coaxially aligned rod 24, with an externally threaded rear end portion 25 mounting a first abutment member 26 spaced from the distal terminal end of the threaded rear end portion 25 to define a threaded shank portion threadedly receivable within the internally threaded support boss 20 to orient the mounting spike 23 orthogonally rearwardly of the triangular framework 11, as illustrated in FIG. 6 for example. A pointed forward end 28 permits ease of securement of the spike within an associated support post 29 (see FIG. 8), wherein a second abutment member 27 is fixedly mounted to the rod 24 spaced from the pointed forward end 28 and the first abutment member 26 to effect spacing of the framework from an associated support post.

For further use of the instant invention and permitting ease of removal subsequent to its use, a removal lever 30 is provided. The lever 30 includes a top arcuate lever 31 in circular alignment with a bottom arcuate lever 32, with a lever boss 33 positioned to accommodate and receive the top and bottom arcuate levers 31 and 32 respectively. wherein the top and bottom levers 31 and 32 are defined about a constant radius. The top lever 31 is of a greater length than the bottom lever 32, as the bottom lever 32 functions as a fulcrum in use and removal of the mounting spike 23 upon nanual grasping of the top arcuate lever 31 and pulling the lever 31 relative to the support post 29. The lever boss 33 accordingly is formed with a conical bore 34 directed therethrough, wherein the conical bore permits lateral repositioning of the rod 24 during its levered removal from the post 29 to avoid deformation of the rod during such removal procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A game support rack comprising, in combination,
   a triangular framework defined by a base leg, a right leg, and a left leg, and
   a first apex junction defined at an intersection of the base leg and the right leg, a second apex junction defined by an intersection of the left leg and base leg, and a third apex junction defined by an intersection of the right leg and left leg, and
   a first hook extending orthogonally and exteriorly of the triangular framework and mounted at the first apex junction, and
   a second hook mounted orthogonally and outwardly of the triangular framework at the second apex junction, and
   an internally threaded support boss fixedly mounted at the third apex junction, and a mounting spike defined by an elongate coaxially aligned rod, including a threaded rear end portion, wherein the threaded rear end portion is received within the internally threaded support boss, and wherein the internally threaded support boss is defined by a central threaded bore, wherein the central bore includes an axis orthogonally oriented relative to the triangular framework to orient the rod orthogonally relative to the framework when the threaded rear end portion is received within the internally threaded support boss, and wherein the rod includes a first abutment member mounted about the rod on the threaded rear end portion spaced from a distal end of the threaded rear end portion defined by a threaded shank for reception within the internally threaded support boss, and a second abutment member mounted to the rod in a spaced relationship relative to the first abutment member, wherein the second abutment member is spaced from a pointed forward end of the rod to space the triangular framework relative to a support post for enchanced access to a game animal mounted on the triangular framework, and further including a removal lever mounted on the rod between the pointed forward end and the second abutment member, wherein the removal lever includes a top arcuate lever mounted to a lever boss and a bottom arcuate lever mounted to a lever boss, wherein the top and bottom arcuate levers define a continuous arc defined about a constant radius.

2. An apparatus as set forth in claim 1 wherein the lever boss includes a conical bore radially directed through the removal lever, wherein the conical bore receives the rod therethrough and permits displacement of the rod within the conical bore to minimize deformation of the rod upon removal of the rod subsequent to mounting of the rod within a support post.

* * * * *